United States Patent
Green

(10) Patent No.: US 7,122,989 B2
(45) Date of Patent: Oct. 17, 2006

(54) MULTIPLE SPEED MOVER ASSEMBLY

(75) Inventor: Evan Drake Harriman Green, San Jose, CA (US)

(73) Assignee: Bookham Technology plc, Northhamptonshire (GB)

( * ) Notice: Subject to any disclaimer, the term of this patent is extended or adjusted under 35 U.S.C. 154(b) by 0 days.

(21) Appl. No.: 10/913,267

(22) Filed: Aug. 5, 2004

(65) Prior Publication Data

US 2006/0028158 A1    Feb. 9, 2006

(51) Int. Cl.
*H01L 41/09* (2006.01)
*H02N 2/14* (2006.01)

(52) U.S. Cl. .................. 318/590; 318/504; 310/311

(58) Field of Classification Search ........... 318/560, 318/590, 595, 652, 459, 504; 33/813, 815, 33/501, 501.6, 510, 531, DIG. 4; 310/311, 310/314, 318
See application file for complete search history.

(56) References Cited

U.S. PATENT DOCUMENTS

| | | | |
|---|---|---|---|
| 3,805,393 A * | 4/1974 | Lemelson | 33/555 |
| 4,868,460 A * | 9/1989 | Papanicolaou | 315/200 R |
| 4,908,953 A * | 3/1990 | Wallisser | 33/701 |
| 4,977,685 A * | 12/1990 | Shahlapour | 33/783 |
| 5,294,839 A * | 3/1994 | Jaeschke | 307/127 |
| 5,394,049 A | 2/1995 | Luecke | |
| 5,410,206 A | 4/1995 | Luckee et al. | |
| 5,542,188 A * | 8/1996 | Ertl et al. | 33/605 |
| 5,568,004 A | 10/1996 | Kleindiek | |
| 5,575,078 A * | 11/1996 | Moulton, III | 33/815 |
| 6,147,434 A | 11/2000 | Nakano et al. | |
| 6,313,597 B1 * | 11/2001 | Elliott et al. | 318/701 |
| 6,476,537 B1 | 11/2002 | Pease et al. | |
| 6,617,817 B1 * | 9/2003 | Hill | 318/560 |
| 6,662,666 B1 * | 12/2003 | Hasegawa | 73/831 |
| 6,707,231 B1 | 3/2004 | Pease et al. | |
| 6,753,670 B1 * | 6/2004 | Kadah | 318/727 |
| 2004/0124743 A1 | 7/2004 | Pease et al. | |
| 2004/0124744 A1 | 7/2004 | Pease et al. | |

FOREIGN PATENT DOCUMENTS

| | | |
|---|---|---|
| DE | 198 06 127 A 1 | 8/1999 |
| EP | 0 747 977 | 12/1996 |

* cited by examiner

*Primary Examiner*—Bentsu Ro
(74) *Attorney, Agent, or Firm*—Steven G. Roeder

(57) ABSTRACT

A mover assembly (16) that moves or positions an object (12) includes a mover output (226), an actuator (230), and a control system (18). The mover output (226) is connected to the object (12), and the actuator (230) causes the mover output (226) to move. The control system (18) selectively directs a drive signal to the actuator (230) in a first mode and in a second mode. In the first mode, a peak voltage and a baseline voltage are sequentially directed to the actuator (230). In the second mode an intermediate voltage is directed to the actuator (230), the intermediate voltage being intermediate the peak voltage and the baseline voltage.

25 Claims, 10 Drawing Sheets

MULTIPLE SPEED MOVER ASSEMBLY

BACKGROUND

Motors are commonly used as part of an apparatus to make adjustments to the position and/or shape of an object. One type of motor is a piezo-driven motor that utilizes a piezoelectric element to move a mover output. In one design, current is directed to the piezoelectric element in a pulsed fashion to cause movement of the mover output at a plurality of discrete step sizes.

Unfortunately, the rate of movement of the mover output can be limited and/or the resolution of the motor is limited to the discrete step sizes.

SUMMARY

The present invention is directed to a mover assembly that moves or positions an object. In one embodiment, the mover assembly includes a mover output, an actuator, and a control system. The mover output is connected to the object and the actuator causes the mover output to rotate about a first axis.

In one embodiment, the control system selectively directs a drive signal to the actuator in a first mode and in a second mode. In the first mode, a peak voltage and a baseline voltage are sequentially directed to the actuator. In the second mode, an intermediate voltage is directed to the actuator, the intermediate voltage being intermediate the peak voltage and the baseline voltage.

In the first mode, the actuator moves between an expanded configuration and a retracted configuration. In the second mode, the control system can direct a continuous intermediate voltage to the actuator that causes the actuator to lengthen to an intermediate configuration.

In one embodiment, the actuator includes a piezoelectric element that causes rotation of the mover output. For example, the actuator can also include a pair of opposed jaw elements that engage the mover output and the piezoelectric element can move the jaw elements relative to each other.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
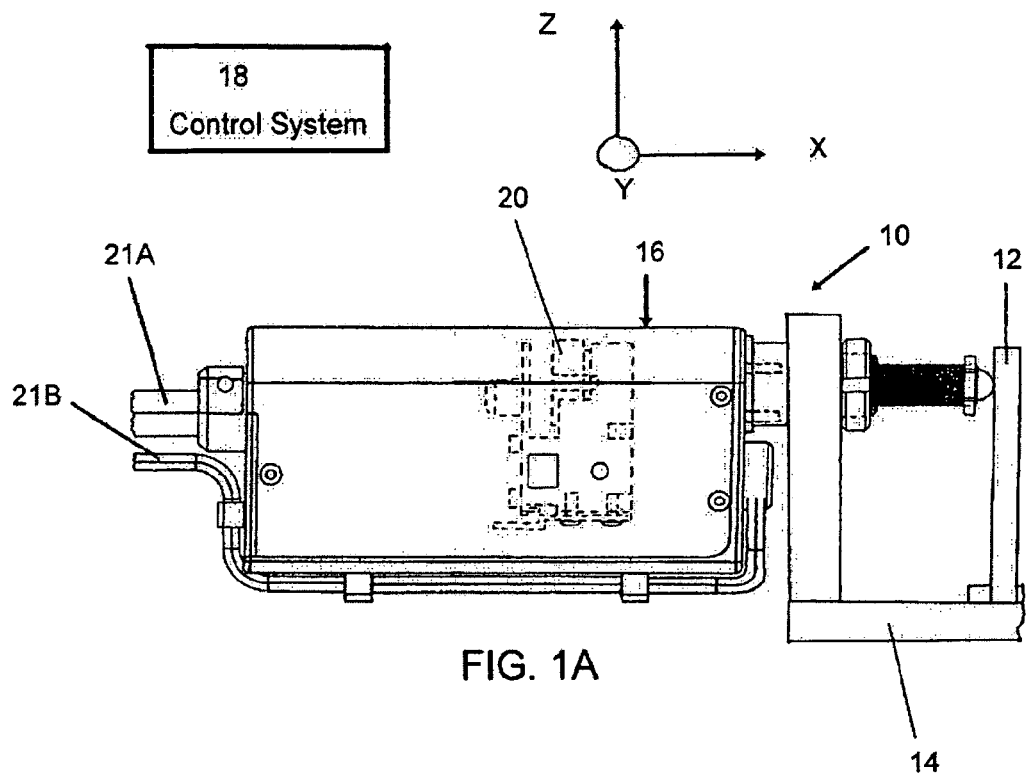
FIG. 1A is a side view of a precision apparatus that utilizes a mover assembly having features of the present invention.

FIG. 1A is a perspective illustration of a precision apparatus 10 having features of the present invention, that makes fine adjustments to the position and/or shape of an object 12. In this embodiment, the precision apparatus 10 includes an apparatus frame 14, a mover assembly 16, and a control system 18. As an overview, in one embodiment, the control system 18 directs current and controls the mover assembly 16 to selectively create both fast and slow motions of the mover assembly 16. In FIG. 1A, the control system 18 is positioned away from the mover assembly 16. Alternatively, the control system 18 can be incorporated into the mover assembly 16.

A number of Figures include an orientation system that illustrates an X axis, a Y axis that is orthogonal to the X axis, and a Z axis that is orthogonal to the X and Y axes. It should be noted that these axes can also be referred to as the first, second, and third axes.

The design of the components of the apparatus 10 and the type of apparatus 10 and object 12 can be varied. For example, the apparatus 10 can be used in technical or scientific instruments including lasers, interferometers, mirrors, lenses, and telescopes. Alternatively, for example, the mover assembly 16 can be used in connection with technical or scientific instruments including lasers, interferometers, mirrors, lenses, and telescopes.

The apparatus frame 14 is rigid and connects the mover assembly 16 to the apparatus 10.

The mover assembly 16 is coupled to the object 12. In one embodiment, the mover assembly 16 has a relatively low mass, small size, high load capability, wide operating temperature range, and/or low power consumption. In one embodiment, the mover assembly 16 provides adjustment with a fine resolution of less than approximately 1 nanometers, over a range of at least approximately +/−100 nanometers and a coarse resolution of approximately 10 nanometers, over a range of at least approximately +/−0.1 mm. In alternative embodiments, the fine adjustment resolution can be greater or less than 1 nm and the coarse adjustment resolution can be greater or less than 10 nanometers and/or the range of travel can be greater or less than +/−0.1 mm.

In one embodiment, the mover assembly 16 includes a measurement system 20 (illustrated in phantom) that allows for closed loop control of the mover assembly 16. For example, the measurement system 20 can monitor the position of a portion of the mover assembly 16 and provide the information to the control system 18. Additionally or alternatively, the measurement system 20 can include one or more sensors (not shown) that also monitor the position or shape of the object 12 and provide the information to the control system 18.

The control system 18 receives information from the measurement system 20 and directs current to the mover assembly 16 to make adjustments to the position and/or shape of the object 12. In FIG. 1A, a first electrical line 21A electrically connects the measurement system 20 to the control system 18 and a second electrical line 21B electrically connects an actuator 230 (illustrated in FIGS. 2A and 2B) of the mover assembly 16 to the control system 18. In alternative embodiments, the electrical lines can be combined, or the measurement system line may be optical or radio signal link.

Figure 1B:
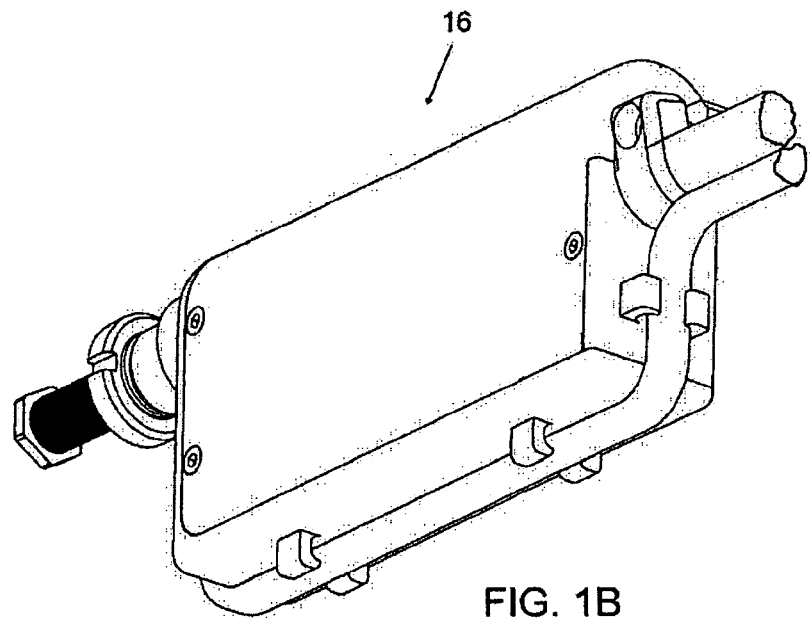
FIG. 1B is a perspective view of the mover assembly of FIG. 1A.

FIG. 1B is a perspective view of the mover assembly 16 of FIG. 1A.

Figure 2A:
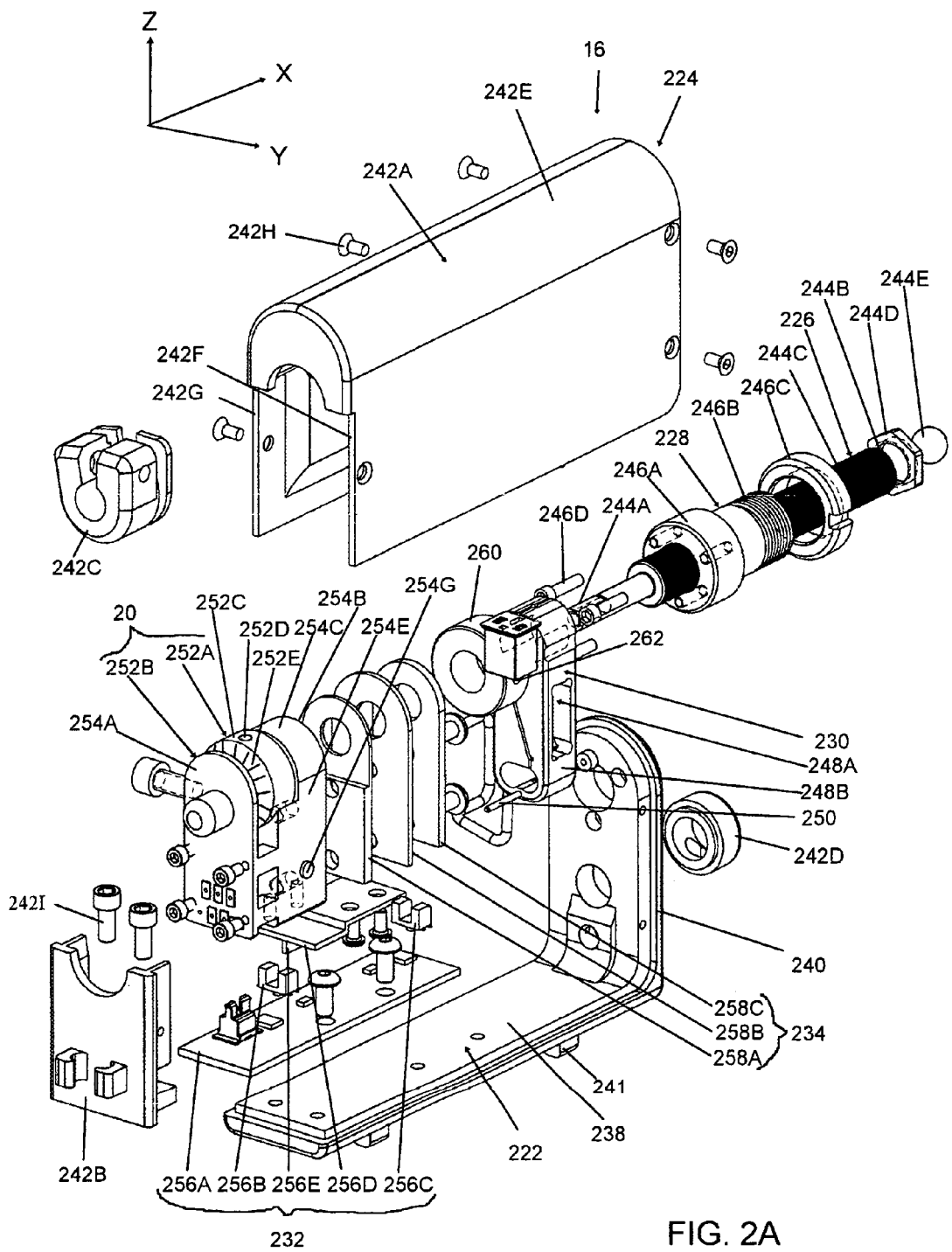
FIG. 2A is a first exploded perspective view of the mover assembly of FIG. 1A.
Figure 2B:
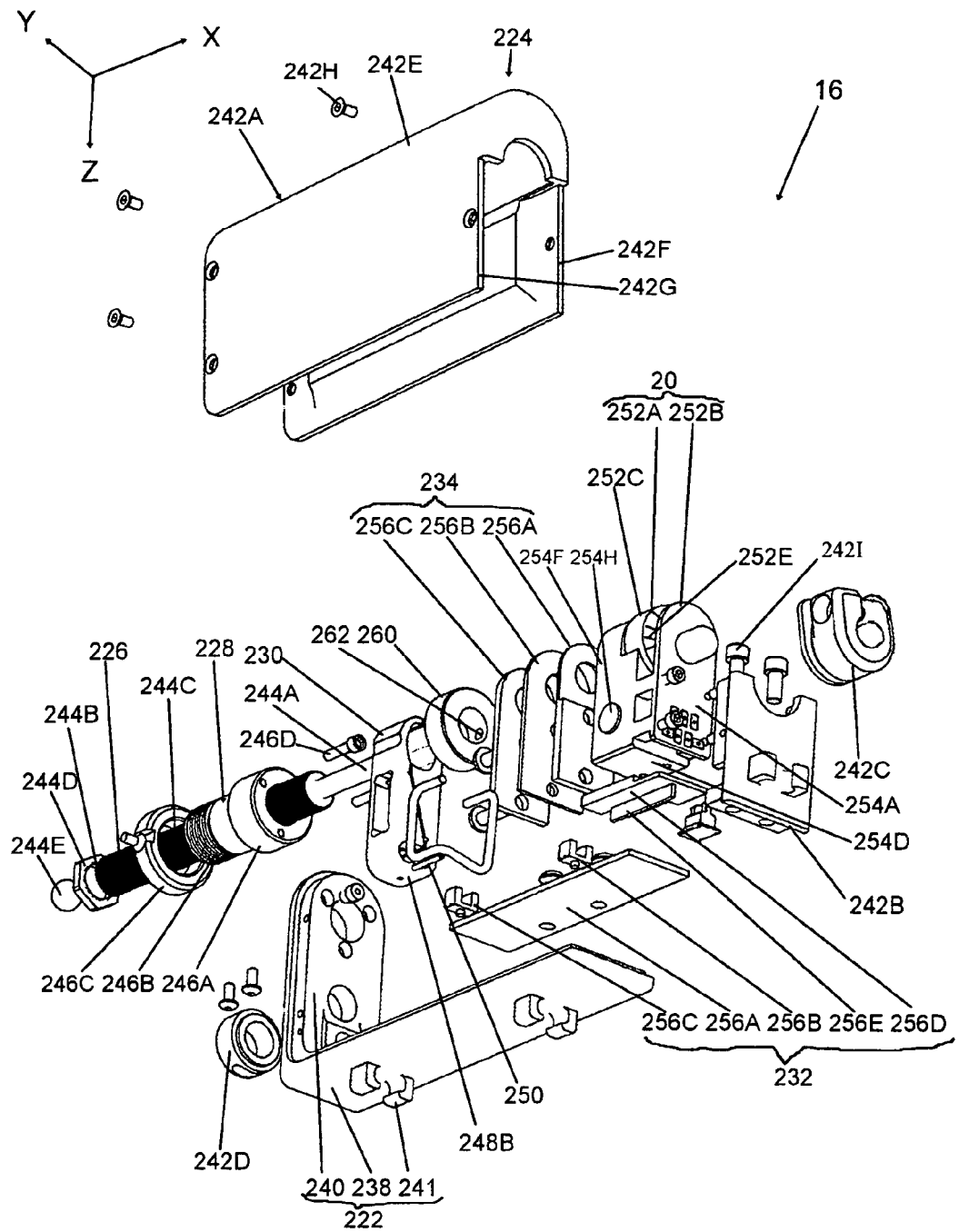
FIG. 2B is an alternative exploded perspective view of the mover assembly of FIG. 1A.

FIG. 2A is a first exploded perspective view and FIG. 2B is a second exploded perspective view of the mover assembly 16 of FIG. 1B. In this embodiment, the mover assembly 16 includes a mover bracket 222, a mover cover 224, a mover output 226, an output guide 228, an actuator 230, the measurement system 20, a limit sensor assembly 232, and a wiper assembly 234. The design, size, shape and/or orientation of one or more of these components can be changed to suit the design requirements of the mover assembly 16.

The mover bracket 222 is rigid and supports some of the other components of the mover assembly 16. In FIGS. 2A and 2B, the mover bracket 222 is shaped somewhat similar to a sideways "L" and includes a bracket base 238 and a bracket arm 240 that extends upward from the bracket base 238. In this embodiment, the mover bracket 222 includes a plurality of clips 241 for securing the second electrical line 21B to the mover bracket 222.

The mover cover 224 cooperates with the mover bracket 222 to enclose some of the components of the mover assembly 16. In FIGS. 2A and 2B, the mover cover 224 includes a main section 242A, an end section 242B, a first line cover 242C, and a second line cover 242D. The main section 242A has a somewhat upside down "U" shape and includes an arch shaped region 242E, a cover first side wall 242F, and a spaced apart cover second side wall 242G. The side walls 242F, 242G extend away from the arch shaped region 242E. In one embodiment, the main section 242A is secured to the mover bracket 222 and the end section 242B with a plurality of fasteners 242H. The end section 242B is secured to the bracket base 238 with a pair of fasteners 242I. The first line cover 242C is secured to the top of the end section 242B and encircles and provides a seal around the first electrical line 21A (illustrated in FIG. 1). Somewhat similarly, the second line cover 242D is secured to the bracket arm 240 and provides a seal around the second electrical line 21B (illustrated in FIG. 1).

In one embodiment, the mover output 226 is rotated about the X axis and is moved laterally along the X axis by the actuator 230 and the output guide 228. In FIGS. 2A and 2B, the mover output 226 is generally cylindrical shaped shaft and includes a proximal shaft end 244A and a distal shaft end 244B. In FIGS. 2A and 2B, a portion of the outer circumference of the mover output 226 includes an externally threaded surface 244C. In one embodiment, the majority of the outer circumference includes an 80 pitch externally threaded surface 244C. Alternatively, the entire outer circumference can include the externally threaded surface 244C, only a small portion of the outer circumference can include the externally threaded surface 244C, or none of the outer circumference can include the externally threaded surface 244C. It should also be noted that the pitch of the externally threaded surface 244C can be greater than 80 pitch or less than 80 pitch.

In one embodiment, the mover output 226 includes a stopper 244D that can be moved relative to the externally threaded surface 244C. In this embodiment, the stopper 244D can be selectively adjusted to engage the output guide 228 to inhibit further travel of the mover output 226 relative to the output guide 228. In FIGS. 2A and 2B, the stopper 244D is a hex nut having an internally threaded surface that corresponds to and engages the externally threaded surface 244C.

Additionally, the mover output 226 can include a ball bearing 244E that fits in a semi-spherical aperture at the distal shaft end 244B. The ball bearing 244E engages the object 12 (illustrated in FIG. 1A) to transfer the linear movement of the mover output 226 to the object. Further, the ball bearing 244E inhibits rotation of the mover output 226 from causing rotation of the object 12. In another embodiment, the distal shaft end 244B can be flat or have another shape as needed.

In one embodiment, the mover output 226 is made stainless steel or other hard material. The mover output 226 is coupled, contacting and/or connected to the object.

The output guide 228 supports the mover output 226, guides the mover output 226 and in certain embodiments, causes rotation of the mover output 226 by the actuator 230 to result in motion of the mover output 226 along the X axis. In FIGS. 2A and 2B, the output guide 228 receives the mover output 226 and includes a generally tubular shaped housing having an annular shaped mounting flange 246A, an internally threaded surface (not shown in FIGS. 2A and 2B), an externally threaded area 246B, and a mount ring 246C that engages the externally threaded area 246B. In one embodiment, the apparatus frame 14 (illustrated in FIG. 1A) fits over a portion of the output guide 228 and is clamped between the mounting flange 246A and the mount ring 246C to secure the mover assembly 16 to the apparatus frame 14.

The internally threaded surface is designed to engage the externally threaded surface 244C of the mover output 226. In FIGS. 2A and 2B, a plurality of guide fasteners 246D extend through the mover bracket 222 and thread into the mounting flange 246A to fixedly secure the output guide 228 to the mover bracket 222. With this design, rotation of the mover output 226 with the actuator 230 about the X axis causes the mover output 226 to move transversely along the X axis relative to the output guide 228 and the rest of the mover assembly 16.

The actuator 230 rotates the mover output 226. The design of the actuator 230 can be varied. In one embodiment, the actuator 230 utilizes a piezoelectric element 248A. One example of an actuator which may be used are those sold under the trade name "New Focus Actuator" available from New Focus, Inc., San Jose, Calif. Other actuators include magnetostrictive actuators such as those available from Energen and piezoactuators. One embodiment of an actuator is described in U.S. Pat. No. 5,410,206, issued to Luecke et al. and assigned to New Focus, Inc., the contents of which are incorporated herein by reference.

Figure 3A:
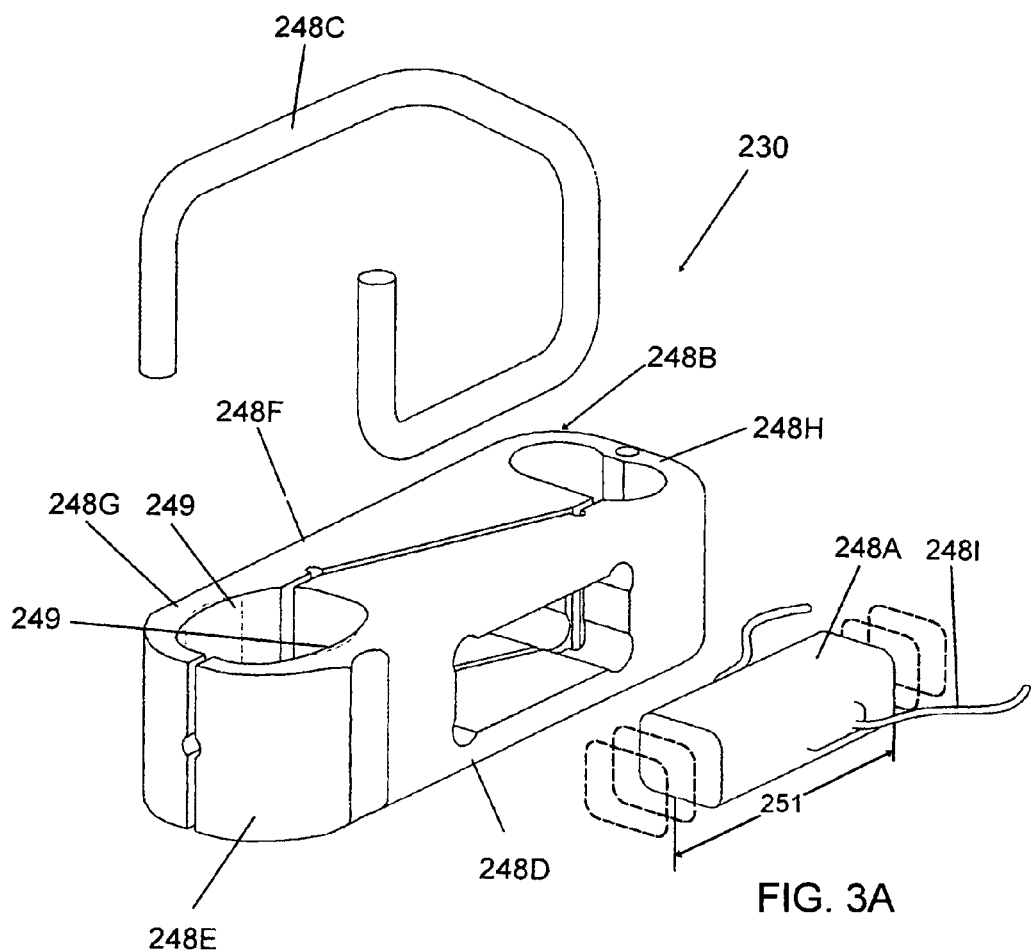
FIG. 3A is an exploded perspective view of an actuator of the mover assembly.

FIG. 3A illustrates an exploded perspective view of the actuator 230. In this embodiment, in addition to the piezoelectric element 248A, the actuator 230 includes an actuator frame 248B and an actuator resilient connector 248C.

The actuator frame 248B is somewhat rectangular shaped and includes (i) a first frame section 248D having a first jaw element 248E, (ii) an adjacent second frame section 248F having a second jaw element 248G, and (iii) a frame base 248H that secures the frame sections 248D, 248F together. The jaw elements 248E, 248G are adjoining and cooperate to fit about the externally threaded surface 244C (illustrated in FIGS. 2A and 2B) of the mover output 226. In one embodiment, each of the jaw elements 248E, 248G includes an inward facing frictional contact area 249 that engages the mover output 226 near the proximal shaft end 244A. In one embodiment, each of the frictional contact areas 249 is a partly internally threaded region. The threads of the partly threaded region of the jaw elements 248E, 248G act together to engage the externally threaded surface 244C of the mover output 226 between the jaw elements 248E, 248G. Stated another way, the internal faces of the jaw elements 248E, 248G are threaded to accommodate the externally threaded surface 244C of the mover output 226.

In an alternative embodiment, the frictional contact area 249 is a roughened area that engages the mover output 226. In this embodiment, the portion of the outer circumference of the mover output 226 that is engaged by the jaw elements 248E, 248G can be threaded or can include a corresponding frictional contact area.

The actuator resilient connector 248C urges the jaw elements 248E, 248G against the externally threaded surface 244C of the mover output 226. Stated another way, the actuator resilient connector 248C urges the jaw elements 248E, 248G together so that the jaw elements 248E, 248G maintain contact with externally threaded surface 244C of the mover output 226.

The actuator resilient connector 248C in maintained in position with a pair of spring retention grooves in jaw elements 248E, 248G. The actuator resilient connector 248C may be fashioned from any material having suitable spring and fatigue characteristics.

The piezoelectric element 248A is mounted within the actuator frame 248B. In FIG. 3A, a first end of the piezoelectric element 248A is affixed to the frame base 248H and an opposite second end of the piezoelectric element 248A is affixed to a first frame section 248D. The piezoelectric element 248A has electrodes 248I at the opposite ends. The control system 18 (illustrated in FIG. 1A) is electrically connected to the respective electrodes 248I. With this design, the control system 18 can selectively apply a drive signal across the piezoelectric element 248A. The internal structure of piezoelectric element 248A may actually contain a plurality of interconnected electrodes so as to reduce the voltage required to operate the piezoelectric element 248A.

The drive signal causes an element length 251 of the piezoelectric element 248A to change. For example, as the amplitude of the drive signal across the piezoelectric element 248A increases, the element length 251 of the piezoelectric element 248A increases, and as the amplitude of the drive signal across piezoelectric element 248A decreases, the element length 251 of the piezoelectric element 248A decreases.

Figure 3B:
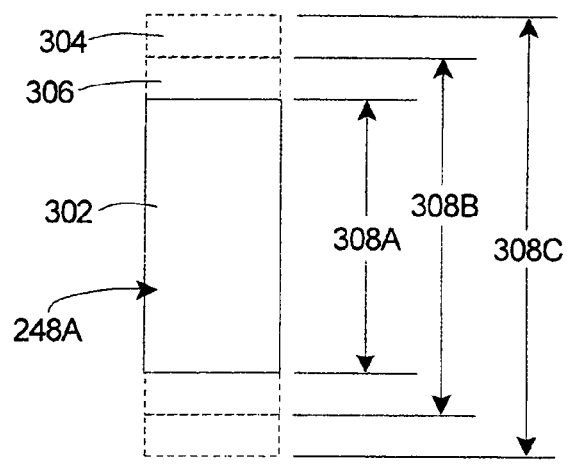
FIG. 3B is a simplified top plan view of a portion of the actuator at a plurality of configurations.

FIG. 3B is an exaggerated simplified top plan view of the piezoelectric element 248A that illustrates the piezoelectric element 248A at a retracted first configuration 302, an expanded second configuration 304 (illustrated in phantom), and an intermediate third configuration 306 (illustrated in phantom) that is between the first configuration 302 and the second configuration 304. In the first configuration 302, the piezoelectric element 248A has a first length 308A; in the second configuration 304, the piezoelectric element 248A has a second length 308B; and in the third configuration 306, the piezoelectric element 248A has a third length 308C. The difference between the element length 251 (illustrated in FIG. 3A) of the piezoelectric element 284A in the first configuration 302 and the second configuration 304 will depend upon the design of the piezoelectric element 284A and the amount of voltage directed to the piezoelectric element 284A. In one embodiment, the difference in the element length is approximately 100 μm for 100 Volts applied.

The control system 18 actively controls the length of the piezoelectric element 248A and controls the rate at which the piezoelectric element 248A moves between the configurations 302, 304, 306. The control system 18 is discussed in more detail below.

Referring back to FIGS. 2A and 2B, in one embodiment, the actuator 230 is secured to the mover bracket 222. In this embodiment, a motor mount pin 250 extends through an aperture in the actuator frame 248B and is secured to the mover bracket 222. With this design, the actuator 230 is inhibited from rotating relative to the mover bracket 222 about the X axis, and the actuator 230 can move slightly along the X axis.

In one embodiment, the measurement system 20 directly monitors the position of the mover output 226 and provides measurement information regarding the position of the mover output 226 to the control system 18 so that the control system 18 can accurately direct current to the actuator 230 to precisely control the position of the mover output 226. Stated another way, the measurement system 20 provides positional feedback for closed-loop control of the actuator 230. The design of the measurement system 20 can be varied. For example, the measurement system 20 can include one or more sensors that directly measure the position of the mover output 226.

In FIGS. 2A and 2B, the measurement system 20 is a rotary type encoder that includes a first encoder component 252A that is fixedly secured to the mover output 226 and a second encoder component 252B that is positioned near and adjacent to the first encoder component 252A. In one embodiment, the rotary encoder performs approximately 5000 encoder counts per revolution of the mover output 226. Further, the rotary encoder can move with the mover output 226. The design of each encoder component 252A, 252B can vary.

In FIGS. 2A and 2B, the first encoder component 252A includes a tubular ring shaped housing 252C that encircles the proximal shaft end 244A and a glass plate 252E that is secured to and moves with the housing 252C. With this design, the first encoder component 252A moves concurrently about the X axis and along the X axis with the mover output 226. In this embodiment, the housing 252C is fixedly secured to the proximal shaft end 244A with a fastener 252D, e.g. a set screw that is threaded into the housing 252C and engages the proximal shaft end 244A. Alternatively, for example, the fastener 252D can be an adhesive. The glass plate 252E includes a plurality of etched lines.

In FIGS. 2A and 2B, the second encoder component 252B is an encoder head. In this embodiment, the encoder head detects the motion of the first encoder component 252A and the mover output 226 relative to the encoder head. The encoder head can read the number of lines of the glass plate 252E that moves past the encoder head. In this embodiment, the second encoder component 252B directly measures rotary motion and/or position of the mover output 226. With the information regarding rotary motion of the mover output 226 and the information regarding the thread pitch of the externally threaded surface 244C of the mover output 226, the control system 18 can determine the linear position of the mover output 226. Stated another way, with the known thread pitch of the externally threaded surface 244C of the mover output 226, the control system 18 can convert the rotary encoder information to linear position information of the mover output 226.

In FIGS. 2A and 2B, the second encoder component 252B is somewhat block "U" shaped and includes a light source (not shown), sensor (not shown), a front wall 254A, a rear wall 254B, a top 254C, a bottom 254D, a first side wall 254E and a second side wall 254F. The top 254C includes a cutout for receiving the first encoder component 252A between the front wall 254A and the rear wall 254B. The rear wall 254B includes an aperture to allow the mover output 226 to extend therethrough.

Additionally, the first side wall 254E includes a first contact region 254G that engages the inner surface of the cover first side wall 242F and the second side wall 254F includes a second contact region 254H that engages the inner surface of the cover second side wall 242G. The contact regions 254G, 254H allow the second encoder component 252B to move with the mover output 226 along the X axis and inhibit the second encoder component 252B from rotating with the mover output 226. With this design, the second encoder component 252B moves concurrently with the mover output 226 along the X axis and the second encoder component 252B is inhibited from rotating with the mover output 226 about the X axis.

The limit sensor assembly 232 detects when a portion of the mover assembly 16 is at a maximum proximal travel limit or at a maximum distal travel limit and sends a signal to the control system 18 so that the control system 18 knows when a portion of the mover assembly 16 is at the maximum proximal travel limit or at the maximum distal travel limit.

In FIGS. 2A and 2B, the limit sensor assembly 232 includes (i) an interrupter circuit board 256A, (ii) a first optical photointerrupter 256B that is secured to the interrupter circuit board 256A, (iii) a spaced apart second optical photointerrupter 256C that is secured to the interrupter circuit board 256A, (iv) a shutter plate 256D, and (v) an optical shutter 256E that is secured to the shutter plate 256D. In this embodiment, (i) the interrupter circuit board 256A and the optical interrupters 256B, 256C are fixedly secured to the mover bracket 222, and (ii) the shutter plate 256D and the shutter 256E are secured to the encoder head and move with the encoder head.

In one embodiment, each optical photointerrupter 256B, 256C includes a light source and a sensor that detects when the optical shutter 256E is positioned between the light source and the sensor. A suitable limit sensor assembly 232 can be made with components from Sharp, located in San Jose, Calif.

The wiper assembly 234 inhibits dust generated from the operation of the actuator 230 from traveling to the measurement system 20. In one embodiment, the wiper assembly 234 is positioned between the actuator 230 and the measurement system 20 and the wiper assembly 234 moves concurrently along the X axis with the mover output 226. However, in this embodiment, the wiper assembly 234 does not rotate with the mover output 226. In FIGS. 2A and 2B, the wiper assembly 234 includes a first plate 258A, a second plate 258B, and a third plate 258C that are secured together and move concurrently with the mover output 226 along the X axis. In this embodiment, each plate 258A, 258B, 258C includes an aperture for receiving the mover output 226. Further, the first plate 258A and the third plate 258C are made of a rigid material and the second plate 258B is made of a resilient material.

In one embodiment, the wiper assembly 234 is fixedly secured to and moves with the second encoder component 252B. For example, in FIGS. 2A and 2B, a shaft mounting ring 260 is used to clamp the wiper assembly 234 against the second encoder component 252B. More specifically, in this embodiment, the shaft mounting ring 260 cooperates with ring shaped housing 252C of the first encoder component 252A to clamp the wiper assembly 234 to the second encoder component 252B. A fastener 262 can be used to fixedly secure the shaft mounting ring 260 to the mover output 226. As an example, the fastener 262 can be a set screw or an adhesive.

Figure 4A:
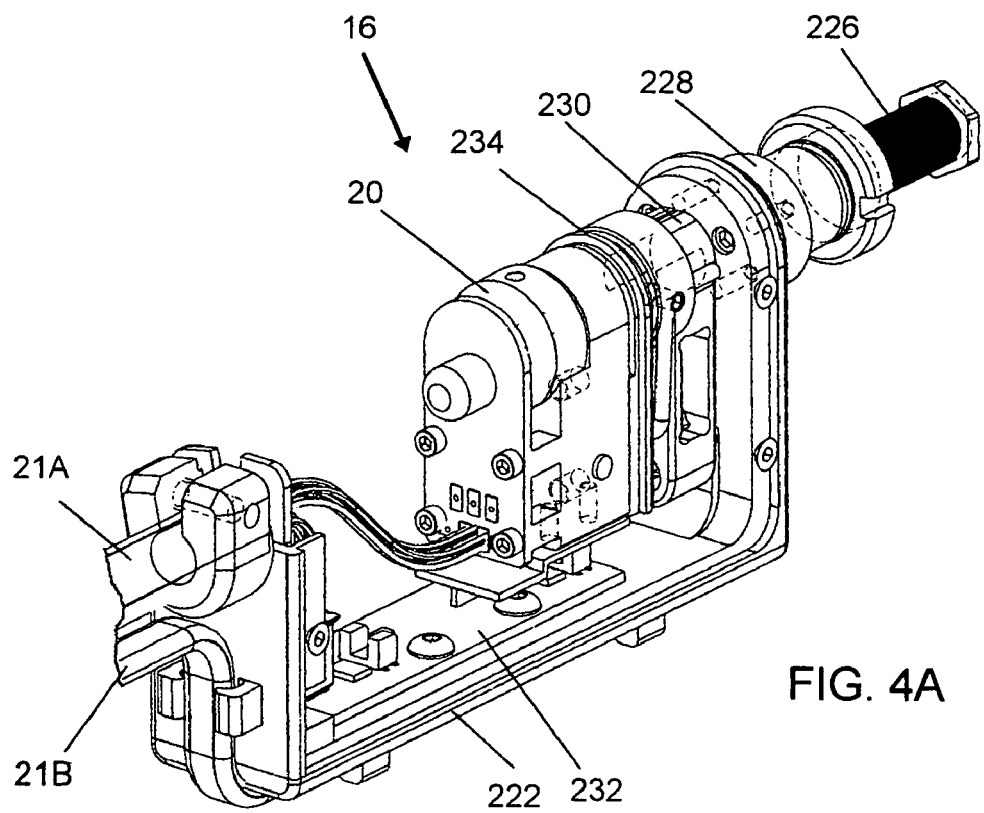
FIG. 4A is a perspective view of a portion of the mover assembly of FIG. 1A.
Figure 4B:
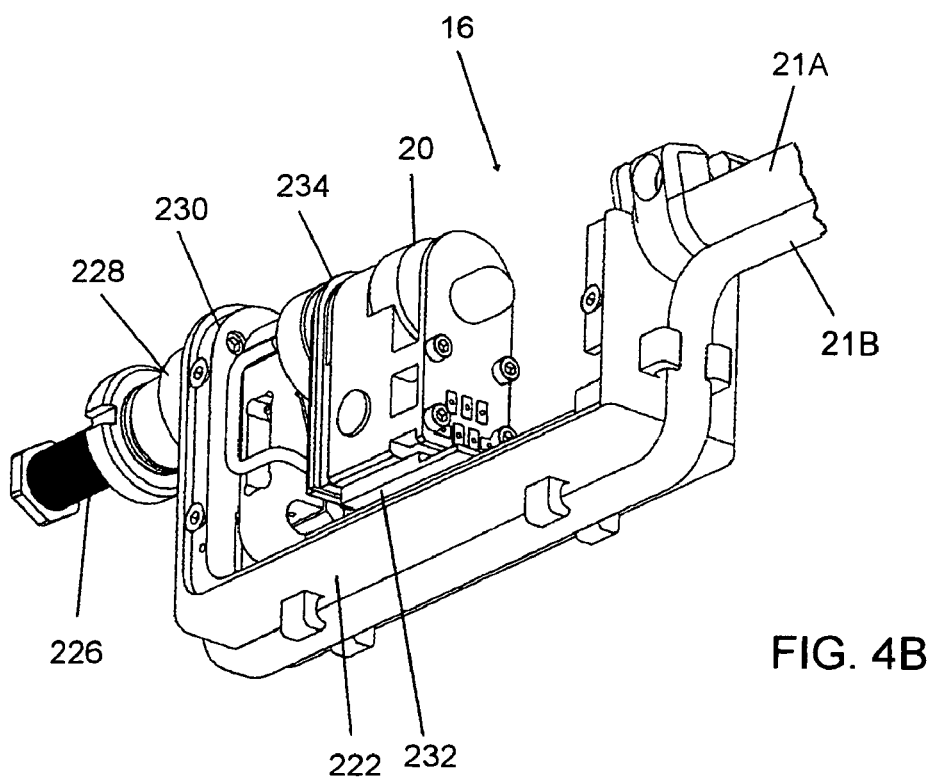
FIG. 4B is an alternative perspective view of a portion of the mover assembly of FIG. 1A.

FIG. 4A is a first perspective view and FIG. 4B is a second perspective view of a portion of the mover assembly 16 including the electrical lines 21A, 21B, the mover bracket 222, the mover output 226, the output guide 228, the actuator 230, the limit sensor assembly 232, the wiper assembly 234 and the measurement system 20 with the mover cover removed.

Figure 5A:
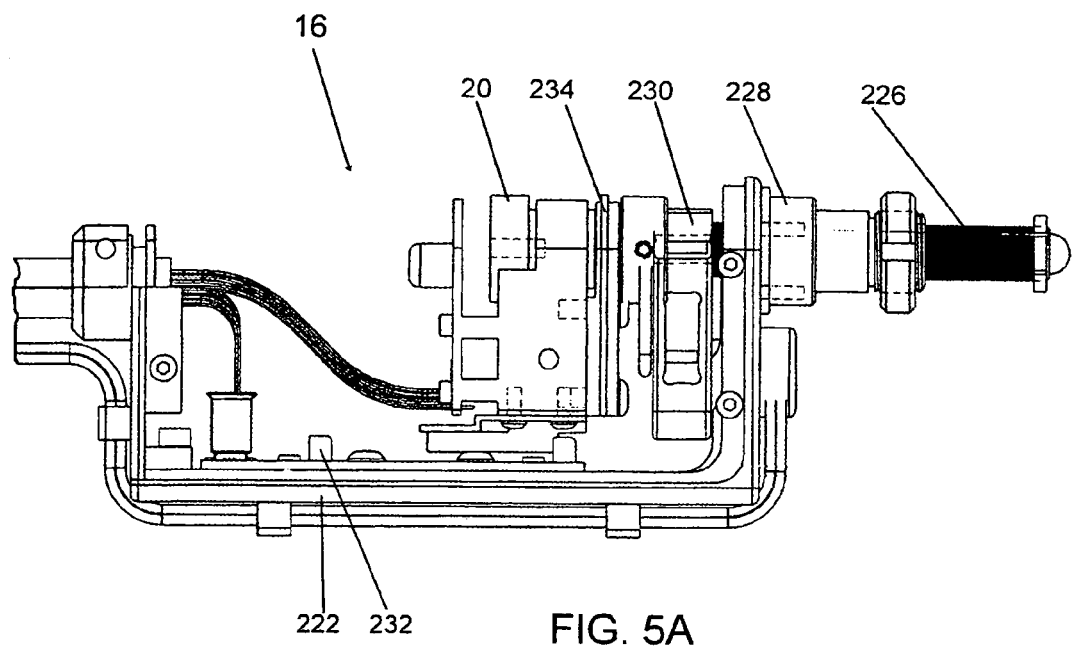
FIG. 5A is a side view of a portion of the mover assembly of FIG. 1A.
Figure 5B:
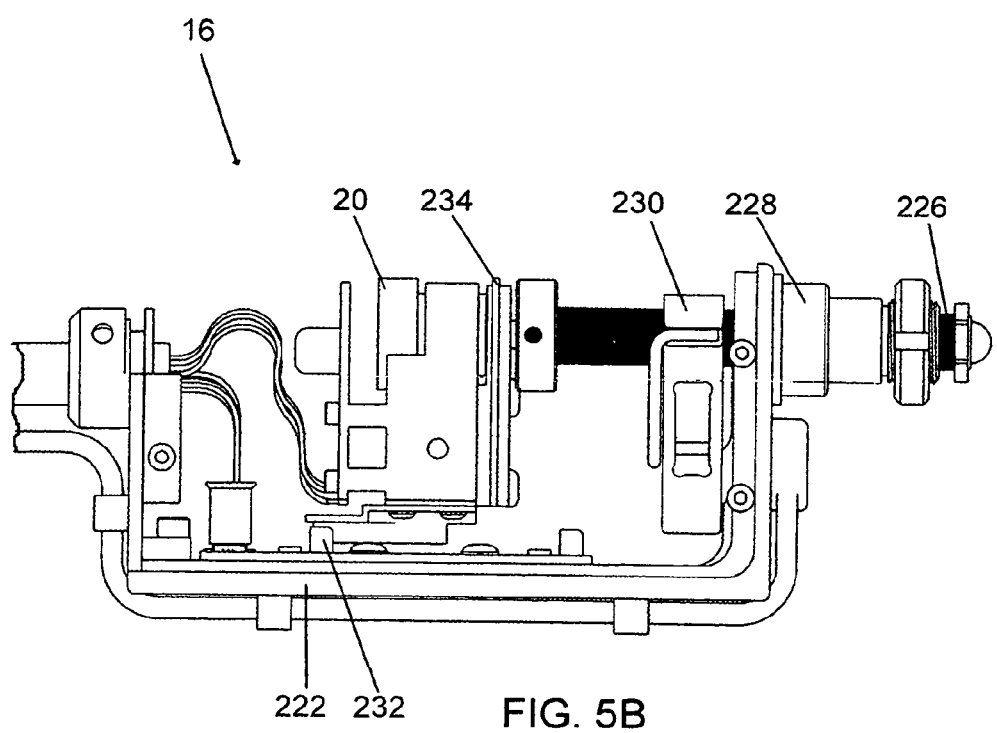
FIG. 5B is an alternative side view of the portion of the mover assembly of FIG. 1A.
Figure 5C:
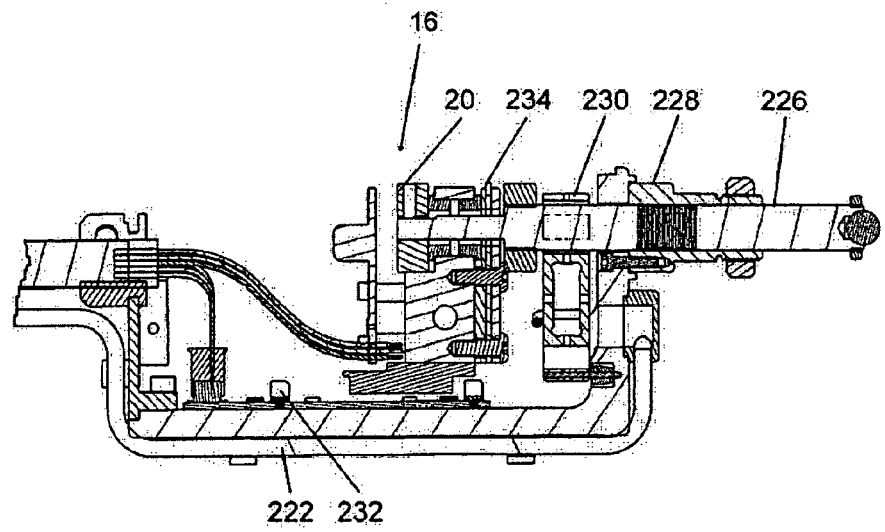
FIG. 5C is a cross-sectional view of the portion of the mover assembly of FIG. 5A.

FIGS. 5A and 5B are alternative side views of the mover assembly 16 and FIG. 5C is a cross-sectional view of the mover assembly 16 including the mover bracket 222, the mover output 226, the output guide 228, the actuator 230, the limit sensor assembly 232, the wiper assembly 234 and the measurement system 20 with the mover cover removed.

The operation of the mover assembly 16 can be understood with reference to FIGS. 3A, 3B and 5C. As described above, the control system 18 (illustrated in FIG. 1B) actively controls the length of the piezoelectric element 248A and controls the rate at which the piezoelectric element 248A moves between the configurations 302, 304, 306. In one embodiment, the control system 18 directs the drive signal to the piezoelectric element 248A in a first mode and a second mode.

With the design provided herein, sequentially lengthening and shortening of the piezoelectric element 248A causes the first jaw element 248E to sequentially move relative to the second jaw element 248G. Assuming that no slippage occurs between the jaw elements 248E, 248G and the mover output 226, rotation of mover output 226 occurs. Stated another way, the control system 18 can direct electrical energy to the piezoelectric element 248A to cause reciprocating motion of the abutting jaw elements 248E, 248G in somewhat parallel paths.

In the first mode, the control system 18 applies a cyclic electrical signal having the proper waveform and polarity. More specifically, in the first mode, the control system 18 sequentially directs (i) a peak voltage to the piezoelectric element 248A that causes the piezoelectric element 248A to lengthen from the first configuration 302 to the second configuration 304 and relative movement of the jaw elements 248E, 248G in a first direction and (ii) a baseline voltage that allows the piezoelectric element 248A to shorten from the second configuration 304 to the first configuration 302, and relative movement of the jaw elements 248E, 248G in an opposite second direction.

The reciprocating motion of the jaw elements 248E, 248G against the mover output 226 is converted to simple rotary motion of the mover output 226 by moving the jaw elements 248E, 248G relatively slowly in the first direction such that the coefficient of friction between the mover output 226 and the jaw elements 248E, 248G overcomes inertia of the mover output 226. Engagement is maintained between the jaw elements 248E, 248G and the mover output 226 incrementally rotates. Motion of the jaw elements 248E, 248G in the second direction is relatively fast, such that the inertia of the mover output 226 prevents it from following the motion of the jaw elements 248E, 248G and the mover output 226 slips in the jaw elements 248E, 248G, preserving the preceding incremental motion. The result is a stepwise, incremental rotation of the mover output 226.

The duration of slippage depends on the waveform and amplitude of the electrical signal applied across the piezoelectric element 248A, as well as the mechanical characteristics of the system, such as the frictional engagement between jaw elements 248E, 248G and the mover output 226, the inertia of the mover output 226 and other mechanical elements connected to it.

Rotational motion of the mover output 226 in the reverse direction is accomplished by simply interchanging the speeds of the motion in the first and second directions. Stated another way, selective rotation of mover output 226 may be obtained in either direction by applying a cyclic electrical signal having the proper waveform and polarity. Accordingly, in the first mode, to rotate the mover output in a first rotational direction, the control system directs a cyclic signal having a slowly rising waveform followed by a rapidly falling waveform. Conversely, to rotate the mover output in the opposite second rotational direction, the control system directs a cyclic signal having a rapidly rising waveform followed by a slowly falling waveform.

Figure 6C:
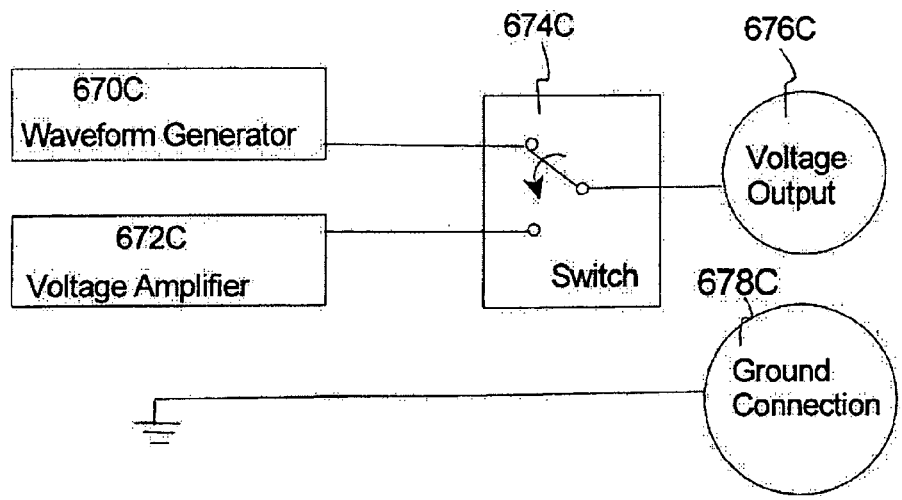
FIGS. 6C–6E illustrate alternative embodiments of a circuit diagram of a control system having features of the present invention.
Figure 6A:
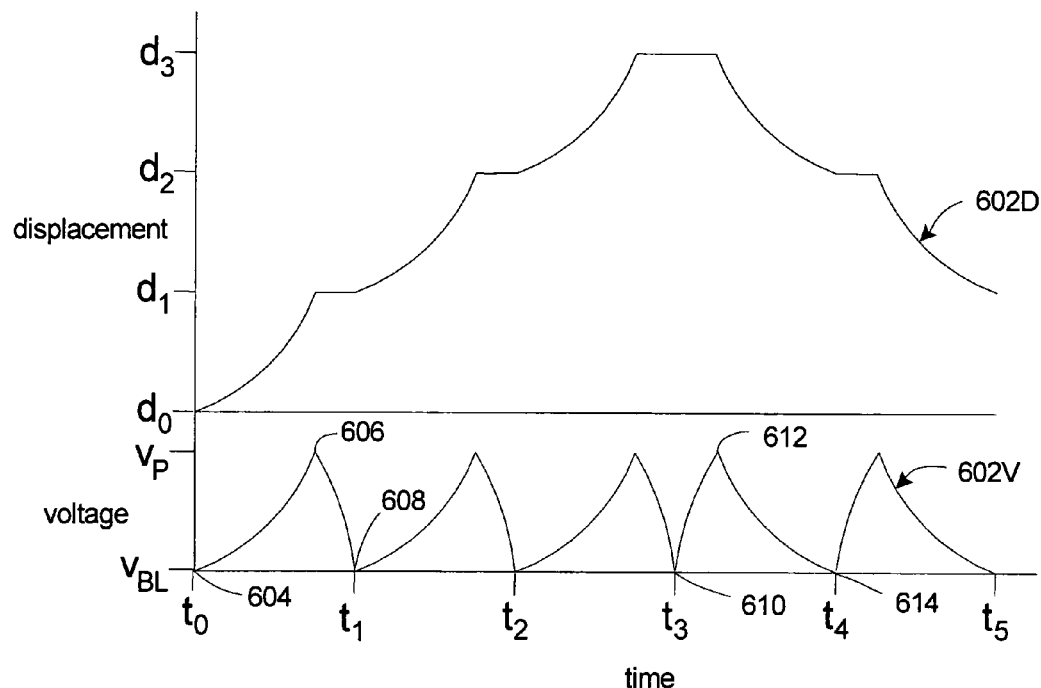
FIG. 6A is a graph that illustrates displacement and voltage versus time for first mode operation.

FIG. 6A is a graph that illustrates an example of a voltage waveform 602V that is applied by the control system in the first mode to the piezoelectric element and the resulting displacement 602D of the mover output versus time. Initially, at point 604, the baseline voltage is directed to the piezoelectric element. At this time, the displacement is $d_0$. Subsequently, the control system applies the peak voltage to the piezoelectric element. FIG. 6A illustrates that the voltage is increased at a relatively slow rate until the peak voltage at 606 is reached. The voltage at this point represents the maximum voltage applied across piezoelectric element, and therefore, also the maximum length of piezoelectric element. Because the applied voltage has been increased slowly, no slippage occurred between the jaw elements 248E, 248G and mover output 226, and the mover output 226 has rotated a short distance in a first rotational direction. In this example, the rotation in the first rotational direction causes the mover output to move from $d_0$ to $d_1$.

Next, the peak voltage is removed from the piezoelectric element. FIG. 6A illustrates that the voltage is decreased at a relatively rapid rate until the baseline voltage at 608 is reached. Stated another way, the voltage falls sharply as indicated by the portion of the waveform between 606 and 608. The voltage at this point represents the minimum voltage applied across piezoelectric element, and therefore, also the minimum length of piezoelectric element. The sharply falling signal causes jaw elements 248E, 248G to move quickly. Since this movement is very rapid, the mechanical characteristics of the system, such as the inertia and frictional engagement of mover output 226, combine to prevent the mover output 226 from following the jaw elements 248E, 248G longitudinal movement. As a result thereof, the mover output does not move and the displacement of the mover output is still $d_1$.

Repetition of the waveform between points 604 and 608 results in incremental movement of mover output 226 in the first rotational direction in a somewhat step-like fashion.

Rotation of mover output 226 in the opposite direction is accomplished by the application of an electrical signal as represented by the waveform beginning at point 610. More specifically, at point 610, the baseline voltage is directed to the piezoelectric element. At this time, the displacement of the mover output is d3. Subsequently, the control system applies the peak voltage to the piezoelectric element 384A. FIG. 6A illustrates that the voltage is increased at a relatively fast rate until the peak voltage at 612 is reached. Because the applied voltage has been increased rapidly, slippage occurred between the jaw elements 248E, 248G and mover output 226, and the mover output 226 does not rotate and the mover output is maintained at $d_3$.

Next, the peak voltage is removed from the piezoelectric element. FIG. 6A illustrates that the voltage is decreased at a relatively slow rate until the baseline voltage at 614 is reached. The slowly falling signal causes jaw elements 248E, 248G to move relatively slowly. Since this movement is very slow, no slippage occurred between the jaw elements 248E, 248G and mover output 226, and the mover output 226 has rotated a short distance in a second rotational direction. In this embodiment, the rotation in the second rotational direction causes the mover output to mover from $d_3$ to $d_2$.

Repetition of the waveform between points 610 and 614 results in incremental movement of mover output 226 in the second rotational direction in a somewhat step-like fashion.

Stated another way, between $t_0$ and $t_1$, the peak voltage is applied to relatively slowly and, next, the voltage is moved quickly from peak voltage to the baseline voltage. This causes the mover output to move from $d_0$ to $d_1$. This process is repeated between $t_1$ and $t_2$ and between $t_2$ and $t_3$. This results in movement of the mover output from $d_1$ to $d_2$ and subsequently from $d_2$ to $d_3$. Alternatively, between $t_3$ and $t_4$, the peak voltage is applied relatively rapidly and, next, the voltage is moved slowly from peak voltage to the baseline voltage. This causes the mover output to move from $d_3$ to $d_2$. This process is repeated between $t_4$ and $t_5$. This results in movement of the mover output from $d_2$ to $d_1$.

It should be noted that it would be possible to produce rotational motion in either direction by the application of a substantially linear waveform having a slowing changing and rapidly changing portions in the manner of a saw-tooth waveform.

In one embodiment, to enhance performance of the system, the portion of the waveform which produces rotation in the desired direction should have a gradually increasing slope since this takes advantage of the shaft acceleration and produces the most rapid rotation in the desired direction. The waveform of the signal in the opposite direction can also have a gradually increasing slope to prevent the jaws from ultimately engaging the shaft in non-slipping relationship. However, since the duration of the portion of the signal which produces jaw movement in the undesired direction may be kept short without substantial prejudicial effects, it is not as critical that it also have a gradually increasing slope. From a practical standpoint, the rapidly rising or falling portion of the waveform is largely dependent on the capacitance of the piezoelectric element, and the slope can be made as great as possible with the selected circuit components.

In this embodiment, each cycle (points 604–608 or 610–614) occurs during a single time interval. The length of the time interval can be varied to suit the design requirements of the mover assembly. In alternative, non-exclusive embodiments, the time interval can be approximately 0.5 millisecond, 1 second, 1 minute, 1 hour, 1 day, or 1 week. Moreover, during each cycle, the mover output moves a single displacement unit in the first rotational direction or the second rotational direction. The size of each displacement unit can be varied to suit the design requirements of the mover assembly. In alternative, non-exclusive embodiments, the displacement unit can be approximately 20, 40, 50, 60, 80, or 100 nm.

The magnitude of the peak voltage and the baseline voltage can be adjusted to suit the design requirements of the components of the precision apparatus. In alternative, non-exclusive embodiments, the peak voltage is approximately 120, or 150 volts DC. In one embodiment, the baseline voltage is approximately zero volts.

In the second mode, the control system selectively directs a fixed intermediate voltage to the actuator. The intermediate voltage is intermediate the peak voltage and the baseline voltage. In second mode, the intermediate voltage can be any value that is less than the peak voltage. For example, the control system can direct current to the actuator at any increment up until the peak voltage. In non-exclusive examples, if the peak voltage is 150 volts, the control system, in the second mode, can direct voltage to the actuator at 5, 10, 15, 20, 25, 30, 35, 40, 45, 50, 55, 60, 65, 70, 75, 80, 85, 90, 95, 100, 105, 110, 115, 120, 125, 130, 135, 140, or 145 volts DC. Stated another way, the control system can direct voltage to the actuator at 5, 10, 15, 20, 25, 30, 35, 40, 45, 50, 55, 60, 65, 70, 75, 80, 85, 90, or 95 percent of the peak voltage.

In the second mode, in one embodiment, the control system selectively adjusts the rate at which the intermediate voltage is applied to the actuator. For example, the rate at which the intermediate voltage is applied to the element can be varied to be between approximately 1 volt/hour to 100 volts/microseconds, depending on rotational and frictional properties of the load.

In alternative, non-exclusive embodiments, the rate at which the intermediate voltage is applied to the element can be approximately 1 Hz, 2 Hz, 100 Hz, 1 kHz, 5 kHz or 10 kHz. Thus, in certain embodiments, the speed at which the mover output is rotated can be faster in the second mode than in the first mode.

Figure 6B:
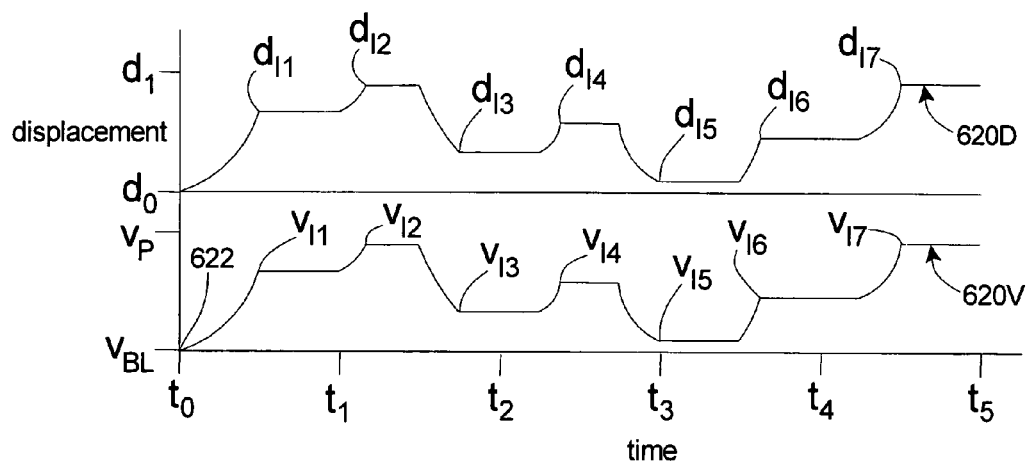
FIG. 6B is a graph that illustrates displacement and voltage versus time for second mode operation.

FIG. 6B is a graph that illustrates an example of a voltage waveform 620V that is applied by the control system in the second mode to the piezoelectric element and the resulting displacement 620D of the mover output versus time. Initially, at point 622, the baseline voltage is directed to the piezoelectric element. At this time, in the example, the displacement is $d_0$. Subsequently, the control system applies a first intermediate voltage $V_{I1}$, to the piezoelectric element. FIG. 6B illustrates that the voltage is increased at a relatively slow rate until the first intermediate voltage $V_{I1}$ at 624 is reached. Because the applied voltage has been increased relatively slowly, no slippage occurred between the jaw elements 248E, 248G and mover output 226, and the mover output 226 has rotated a short distance in the first rotational direction. In this example, the rotation in the first rotational direction causes the mover output to move linearly from $d_0$ to $d_{f1}$.

In one embodiment, the first intermediate voltage $V_{I1}$ is maintained until it is desired to move the mover output. Next, intermediate voltage is changed from the first intermediate voltage $V_{I1}$ to the second intermediate voltage $V_{I2}$. Because the applied voltage has been increased slowly, no slippage occurred between the jaw elements 248E, 248G and mover output 226, and the mover output 226 has rotated a short distance in the first rotational direction. In this embodiment, the rotation in the first rotational direction causes the mover output to move from $d_{f1}$ to $d_{f2}$.

In one embodiment, the second intermediate voltage $V_{I2}$ is maintained until it is desired to move the mover output. Next, the intermediate voltage is changed from the second intermediate voltage $V_{I2}$ to the third intermediate voltage $V_{I3}$. Because the applied voltage has been decreased slowly, no slippage occurred between the jaw elements 248E, 248G and mover output 226, and the mover output 226 has rotated a short distance in the second rotational direction. In this embodiment, the rotation in the second rotational direction causes the mover output to move from $d_{f2}$ to $d_{f3}$.

In one embodiment, the third intermediate voltage $V_{I3}$ is maintained until it is desired to move the mover output. Next, the intermediate voltage is changed from the third intermediate voltage $V_{I3}$ to the fourth intermediate voltage $V_{I4}$. Because the applied voltage has been increased slowly, the mover output 226 has rotated a short distance in the first rotational direction. In this embodiment, the rotation in the first rotational direction causes the mover output to move from $d_{f3}$ to $d_{f4}$.

In one embodiment, the fourth intermediate voltage $V_{I4}$ is maintained until it is desired to move the mover output. Next, intermediate voltage is changed from the fourth intermediate voltage $V_{I4}$ to the fifth intermediate voltage $V_{I5}$. Because the applied voltage has been decreased slowly, the mover output 226 has rotated a short distance in the second rotational direction. In this embodiment, the rotation in the second rotational direction causes the mover output to move from $d_{f4}$ to $d_{f5}$.

In one embodiment, the fifth intermediate voltage $V_{I5}$ is maintained until it is desired to move the mover output. Next, intermediate voltage is changed from the fifth intermediate voltage $V_{I5}$ to the sixth intermediate voltage $V_{I6}$. Because the applied voltage has been increased slowly, the mover output 226 has rotated a short distance in the first rotational direction. In this embodiment, the rotation in the first rotational direction causes the mover output to move from $d_{f5}$ to $d_{f6}$.

In one embodiment, the sixth intermediate voltage $V_{I6}$ is maintained until it is desired to move the mover output. Next, intermediate voltage is changed from the sixth intermediate voltage $V_{I6}$ to the seventh intermediate voltage $V_{I7}$. Because the applied voltage has been increased slowly, the mover output 226 has rotated a short distance in the first rotational direction. In this embodiment, the rotation in the first rotational direction causes the mover output to move from $d_{f6}$ to $d_{f7}$.

FIG. 6B illustrates that in the second mode, the mover output can be rapidly and precisely adjusted. Further, with the present design, the position of the mover output can be accurately, rapidly, and incrementally, positioned and moved within one displacement unit.

In alternative, non-exclusive examples, the fixed voltage can be maintained for approximately 1 millisecond, 1 second, 1 hour, 1 day, or 1 week, and can be controlled and adjusted through feedback as described herein.

Further, FIG. 6B illustrates that in certain circumstances, the intermediate voltage can be applied at a faster rate without slippage between the jaw elements and the mover output than the peak voltage, in the first mode. Thus, the mover output can be rapidly positioned within one displacement unit. For example, the intermediate voltage can be applied at a rate of 100 volts per 100 microsecond.

In an alternative embodiment, the control system can rapidly remove the intermediate voltage in the second mode.

In one embodiment, the control system can optimize performance by selectively using the first mode or the second mode. With this design, in certain embodiments, the present invention allows for use of a singe actuator to perform both fast, high resolution motion and the slower coarse motion. This can reduce system costs and size.

In one embodiment, bi-directional rotation of the mover output 226 in the range of 2–3 RPM can be achieved. In one embodiment, a single step of the actuator 230 provides approximately 1 minute of rotational movement of the mover output 226, and very precise positioning on the order of 0.02 micrometers.

Operation of one embodiment of the mover assembly can be further understood with the following example. In this example, the mover output is moved a displacement unit during each cycle in the first mode. Initially, the object is at displacement unit $d_0$ and needs to be moved to position $d_{8.5}$. In this example, the control system is in the first mode to move the mover output 8 displacement units in the step like fashion. Subsequently, the control system directs power in the second mode to move the mover output the 0.5 displacement units.

In this example, if the position of the mover output is needed to be changed to $d_{8.7}$, the control system directs power in the second mode to move the mover output an additional 0.2 displacement units. Further, in this example, if the position of the mover output is required to be changed to $d_{8.2}$, the control system directs power in the second mode to move the mover output 0.5 displacement units.

FIG. 6C is an illustration of one embodiment of electronic circuitry for generating the appropriate control and drive signals in the first mode and the second mode. More specifically, in this embodiment, (i) box 670C designates a waveform generator that provides the drive signal in the first mode, (ii) box 672C designates a voltage amplifier that provides the drive signal in the second mode, (iii) box 674C designates a switch that is selectively moved between the drive signal in the first mode and the drive signal in the second mode, (iv) circle 676C represents the voltage output to the actuator 230 (illustrated in FIG. 2A), and (v) circle 678C represents the ground connection to the actuator 230.

Figure 6D:
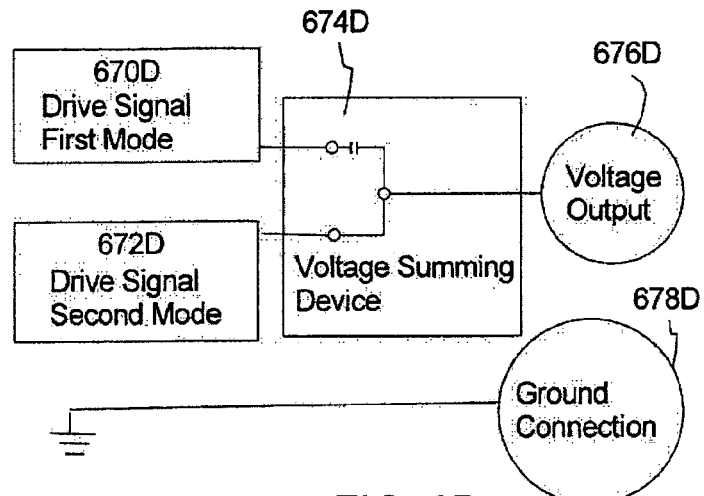

FIG. 6D is an illustration of another embodiment of electronic circuitry for generating the appropriate control and drive signals in the first mode and the second mode. More specifically, in this embodiment, (i) box 670D designates the drive signal in the first mode, (ii) box 672D designates the drive signal in the second mode, (iii) box 674D designates a voltage summing device, (iv) circle 676D represents the voltage output to the actuator 230 (illustrated in FIG. 2A), and (v) circle 678D represents the ground connection to the actuator 230.

Figure 6E:
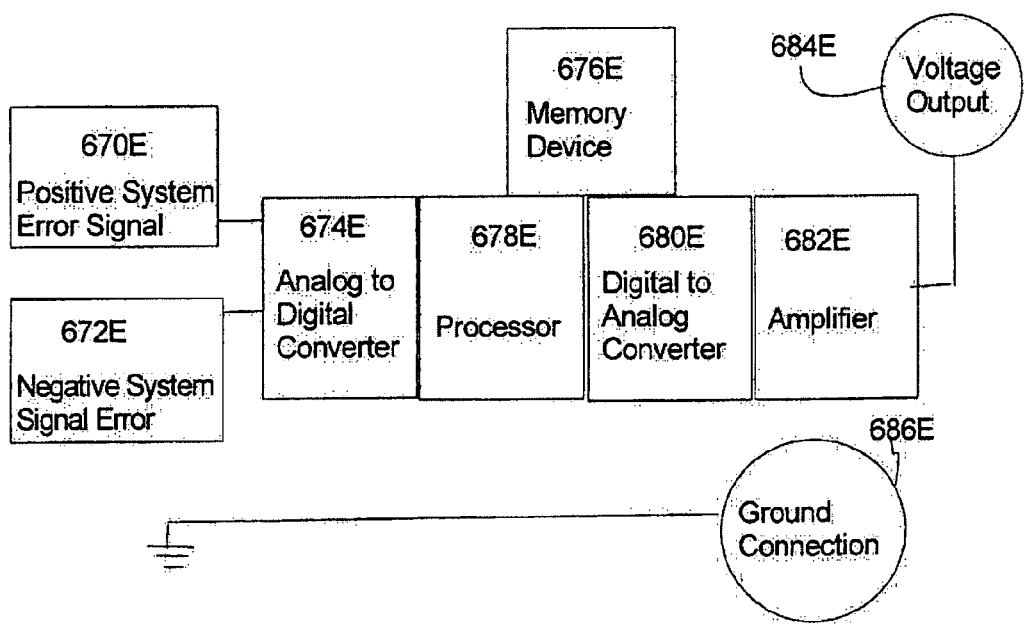

FIG. 6E is an illustration of still another embodiment of electronic circuitry for generating the appropriate control and drive signals in the first mode and the second mode. More specifically, in this embodiment, (i) box 670E designates a positive system error signal received from a measurement system (not shown), (ii) box 672E designates a negative system error signal received from the measurement system, (iii) box 674E designates an analog to digital converter that converts the analog error signal to a digital signal, (iv) box 676E represents a memory device that stores pre-defined criteria regarding voltages to be directed to the actuator 230, (v) box 678E represents a processor that compares the error signal to the pre-defined criteria from the memory device and generates a control signal, (vi) box 680E represents a digital to analogy converter that converts the control signal, (vii) box 682E represents an amplifier that provides the voltage, (viii) circle 684E represents the voltage output to the actuator 230 (illustrated in FIG. 2A), and (ix) circle 686E represents the ground connection to the actuator 230. In one embodiment, the processor 678E reads control/error voltage, the processor 678E compares the system error signal against a pre-defined criteria, and the processor 678E sends signals to the amplifier 682E to provide the desired voltage output 684D.

One non-exclusive example of the pre-defined criteria includes, (i) if the error signal is between −1 volts and 1 volts, the voltage is generated in the second mode, and (ii) if the error signal is greater than 1 volt, the voltage is generated in the first mode.

Figure 7A:
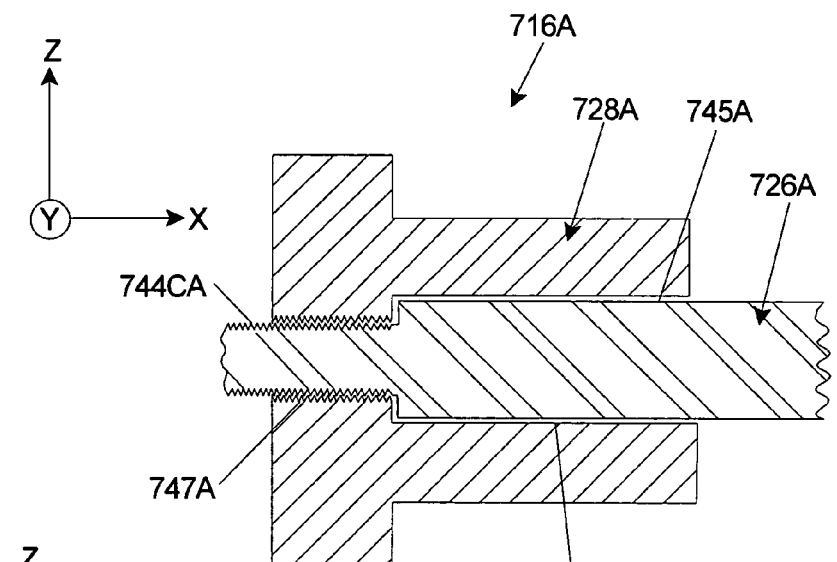
FIG. 7A is an illustration of an alternative embodiment of a portion of the mover assembly.

FIG. 7A is an illustration of an alternative embodiment of a portion of a mover assembly 716A. More specifically, FIG. 7A illustrates a portion of another embodiment of the mover output 726A and a portion of another embodiment of the output guide 728A. In this embodiment, the outer circumference of the mover output 726A includes an externally threaded surface 744CA and a smooth output guide surface 745A and the inner surface of the output guide 728A includes an internally threaded surface 747A and a smooth guide surface 749A. With this design, the threaded surfaces 744CA, 747A cooperate to provide constraint along the X axis and the guide surfaces 745A, 749A cooperate to guide the motion of the mover output 726A.

Figure 7B:
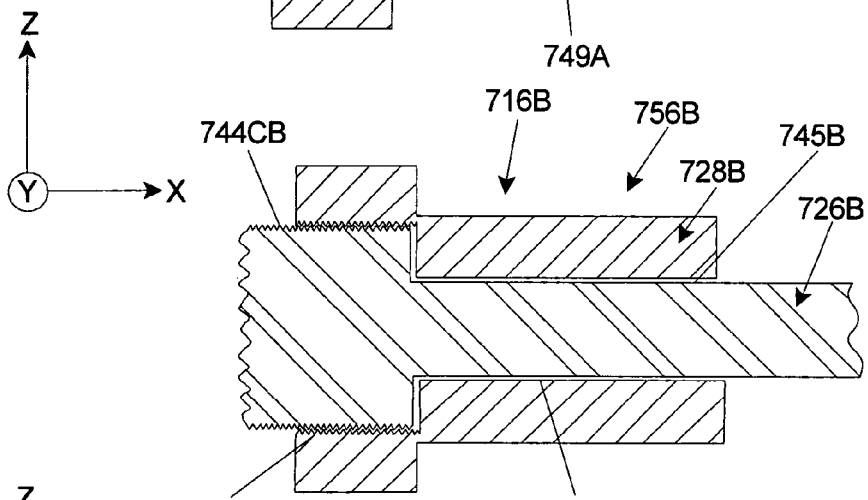
FIG. 7B is an illustration of yet another alternative embodiment of a portion of the mover assembly.

FIG. 7B is an illustration of yet another alternative embodiment of a portion of a mover assembly 716B. More specifically, FIG. 7B illustrates a portion of another embodiment of the mover output 726B and a portion of another embodiment of the output guide 728B. In this embodiment, the outer circumference of the mover output 726B includes an externally threaded surface 744CB and a smooth output guide surface 745B and the inner surface of the output guide 728B includes an internally threaded surface 747B and a smooth guide surface 749B. With this design, the threaded surfaces 744CB, 747B cooperate to provide constraint along the X axis and the guide surfaces 745B, 749B cooperate to guide the motion of the mover output 726B.

Figure 7C:
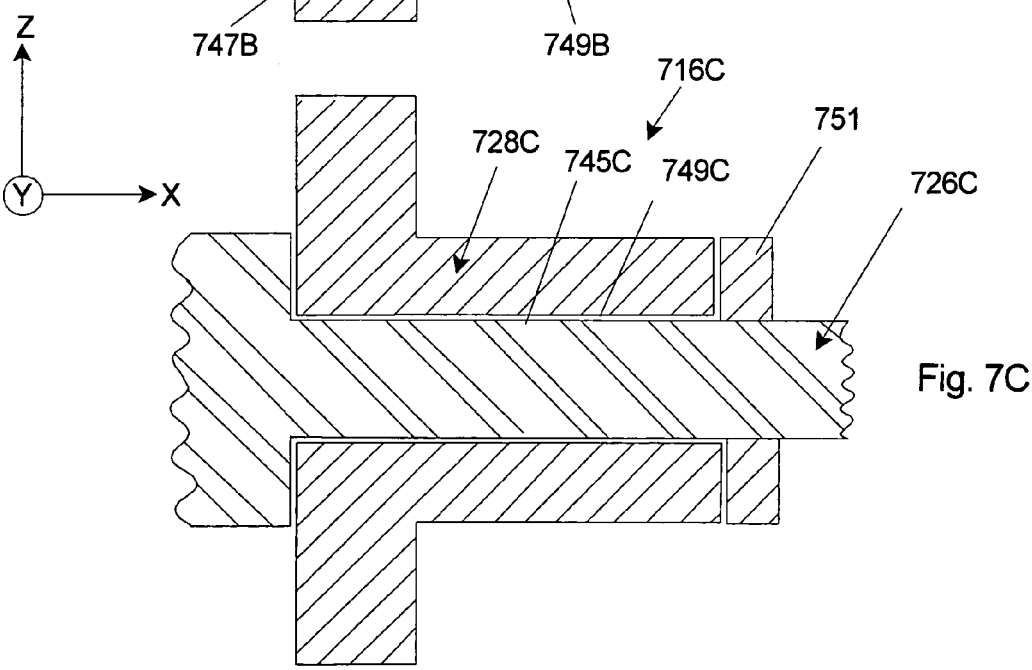
FIG. 7C is an illustration of still another alternative embodiment of a portion of the mover assembly.

FIG. 7C is an illustration of still another alternative embodiment of a portion of a mover assembly 716C. More specifically, FIG. 7C illustrates a portion of another embodiment of the mover output 726C and a portion of another embodiment of the output guide 728C. In this embodiment, the outer circumference of the mover output 726C includes a smooth output guide surface 745C and the inner surface of the output guide 728C includes a smooth guide surface 749C. Further, a lock ring or thrust bearing 751 cooperates with the mover output 726C to inhibit motion of the mover output 726C relative to the output guide 726C along the X axis. With this design, rotation of the mover output 726C by the actuator 230 (illustrated in FIG. 3) results in rotation of the mover output 726C without linear movement of the mover output 726C along the X aixs.

While the particular mover assembly 16 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A mover assembly that moves or positions an object, the mover assembly comprising: a mover output that is coupled to the object, an actuator that includes an element that causes the mover output to rotate, and a control system that selectively directs a drive signal to the actuator in a first mode and in a second mode, in the first mode, a peak voltage is applied to the element to move the element to a first configuration and a baseline voltage is applied to the element to move the element to a second configuration, in the first mode, the peak voltage and the baseline voltage are sequentially applied to the element of the actuator, and in the second mode a single intermediate voltage is directed to the actuator, the intermediate voltage being less than the peak voltage.

2. The mover assembly of claim 1 wherein in the first mode, the actuator incrementally moves the mover output in a discrete step-like fashion.

3. The mover assembly of claim 1 wherein in the second mode, the control system directs a fixed voltage to the actuator that moves the mover output a fixed distance.

4. The mover assembly of claim 1, wherein in the second mode, the element is moved to an intermediate configuration.

5. The mover assembly of claim 4 wherein in the first mode, the actuator moves the mover output in a step-like fashion and in the second mode, the control system directs a fixed voltage to the actuator.

6. The mover assembly of claim 1 wherein the element is a piezoelectric element that causes rotation of the mover output.

7. The mover assembly of claim 6 wherein the actuator includes a pair of opposed jaw elements that engage the mover output and the piezoelectric element moves the jaw elements relative to each other.

8. The mover assembly of claim 1 further comprising a measurement system that provides measurement information, and wherein the control system receives the measurement information and performs positional correction on the measurement information.

9. A precision apparatus including an object and the mover assembly of claim 1.

10. A mover assembly that moves or positions an object, the mover assembly comprising: a mover output that is coupled to the object, a pair of jaw elements that engage the mover output, an actuator that causes relative movement of the jaw elements, the relative movement of the jaw elements causing the movement of the mover output, and a control system that selectively directs a fixed voltage to the actuator.

11. The mover assembly of claim 10 wherein the control system directs the drive signal to the actuator in a first mode and in a second mode, in the first mode, a peak voltage and a baseline voltage are sequentially directed to the actuator, and in the second mode the fixed voltage is directed to the actuator, the fixed voltage being intermediate the peak voltage and the baseline voltage.

12. The mover assembly of claim 10 wherein the actuator includes a piezoelectric element that causes rotation of the mover output.

13. A precision apparatus including an object and the mover assembly of claim 10.

14. A method for moving or positioning an object, the method comprising the steps of:
connecting a mover output to the object;
coupling an actuator to the mover output, the actuator including an element that causes selective rotation of the mover output; and
selectively directing a drive signal to the actuator in a first mode and in a second mode, in the first mode, a peak voltage is applied to the element to move the element to a first configuration, and a baseline voltage is applied to the element to move the element to a second configuration, in the first mode, the peak voltage and the baseline voltage are sequentially applied to the element of the actuator, and in the second mode an intermediate voltage is directed to the element of the actuator to move the element to an intermediate configuration, the intermediate voltage being less than the peak voltage.

15. The method of claim 14 wherein in the first mode, the actuator incrementally moves the mover output in a discrete step-like fashion.

16. The method of claim 14 wherein in the second mode, the control system directs a fixed voltage to the actuator that moves the mover output a fixed distance.

17. The method of claim 14 wherein the element is a piezoelectric element that causes rotation of the mover output.

18. The method of claim 17 wherein the actuator includes a pair of opposed jaw elements that engage the mover output and the piezoelectric element moves the jaw elements relative to each other.

19. A mover assembly that moves or positions an object, the mover assembly comprising: a mover output that is coupled to the object, an actuator that includes an element that causes the mover output to rotate, and a control system that selectively directs a drive signal to the actuator in a first mode and in a second mode, in the first mode, a peak voltage is applied to the element to move the element to a first configuration, and a baseline voltage is applied to the element to move the element to a second configuration, and in the second mode a single intermediate voltage is directed to the element to move the element to an intermediate configuration, the intermediate voltage being less than the peak voltage, wherein in the second mode, the single intermediate voltage is a fixed voltage that moves the mover output a fixed distance.

20. A mover assembly that moves or positions an object, the mover assembly comprising: a mover output that is coupled to the object, an actuator including an element that causes the mover output to rotate, and a control system that selectively directs a drive signal to the actuator in a first mode and in a second mode, in the first mode, a peak voltage and a baseline voltage are applied to the actuator and the element is moved from a first configuration to a second configuration, and in the second mode a single intermediate voltage is directed to the actuator and the element is moved to an intermediate configuration, the intermediate voltage being less than the peak voltage.

21. The mover assembly of claim 20 wherein in the first mode, the actuator moves the mover output in a step-like fashion and in the second mode, the control system directs a fixed voltage to the actuator.

22. A mover assembly that moves or positions an object, the mover assembly comprising: a mover output that is coupled to the object, an actuator that includes a piezoelectric element that causes rotation of the mover output, and a control system that selectively directs a drive signal to the actuator in a first mode and in a second mode, in the first mode, a peak voltage and a baseline voltage are applied to the actuator, and in the second mode a single intermediate voltage is directed to the actuator, the intermediate voltage being less than the peak voltage.

23. The mover assembly of claim 22 wherein the actuator includes a pair of opposed jaw elements that engage the mover output and the piezoelectric element moves the jaw elements relative to each other.

24. A mover assembly that moves or positions an object, the mover assembly comprising: (i) a mover output that is coupled to the object, (ii) an actuator including an element that causes the mover output to rotate, (iii) a control system that selectively directs a drive signal to the element in a first mode and in a second mode, in the first mode, a peak voltage is applied to the element to move the element to a first configuration and a baseline voltage is applied to the element to move the element to a second configuration that is different from the first configuration, in the first mode the peak voltage and the baseline voltage are sequentially applied to the element, and in the second mode a single intermediate voltage is directed to the element to move the element to an intermediate configuration that is between the first configuration and the second configuration, the intermediate voltage being less than the peak voltage, and (iv) a measurement system that provides measurement information, and wherein the control system receives the measurement information and performs positional correction on the measurement information.

25. A mover assembly that moves or positions an object, the mover assembly comprising: a mover output that is coupled to the object, a pair of jaw elements that engage the mover output, an actuator that causes relative movement of the jaw elements and movement of the mover output, and a control system that selectively directs a fixed voltage to the actuator, wherein the actuator includes a piezoelectric element that causes rotation of the mover output.

* * * * *